(12) United States Patent
Ghatage et al.

(10) Patent No.: US 11,966,820 B2
(45) Date of Patent: Apr. 23, 2024

(54) UTILIZING MACHINE LEARNING MODELS WITH A CENTRALIZED REPOSITORY OF LOG DATA TO PREDICT EVENTS AND GENERATE ALERTS AND RECOMMENDATIONS

(71) Applicant: Accenture Global Solutions Limited, Dublin (IE)

(72) Inventors: Prakash Ghatage, Bangalore (IN); Nirav Jagdish Sampat, Mumbai (IN); Kumar Viswanathan, San Jose, CA (US); Naveen Kumar Thangaraj, Salem (IN); Sattish Sundarakrishnan, Agasthiar Patti (IN); Kaustubh Kurhekar, Pune MH (IN); Richard Stephen Vincent Price, Palatine, IL (US)

(73) Assignee: Accenture Global Solutions Limited, Dublin (IE)

( * ) Notice: Subject to any disclaimer, the term of this patent is extended or adjusted under 35 U.S.C. 154(b) by 935 days.

(21) Appl. No.: 16/929,866

(22) Filed: Jul. 15, 2020

(65) Prior Publication Data

US 2022/0019935 A1    Jan. 20, 2022

(51) Int. Cl.
*G06N 20/00* (2019.01)
*G06F 11/30* (2006.01)
(Continued)

(52) U.S. Cl.
CPC ......... *G06N 20/00* (2019.01); *G06F 11/3072* (2013.01); *G06F 11/327* (2013.01); *G06F 18/214* (2023.01); *G06F 18/24323* (2023.01); *G06F 40/30* (2020.01); *G06N 5/04* (2013.01); *G06F 2201/86* (2013.01)

(58) Field of Classification Search
None
See application file for complete search history.

(56) References Cited

U.S. PATENT DOCUMENTS 9,304,796 B1 * 4/2016 Douglas .............. G06F 11/0712
9,516,053 B1   12/2016 Muddu et al.
(Continued)

OTHER PUBLICATIONS

Extended European Search Report for Application No. EP21185721. 4, dated Dec. 9, 2021, 8 pages.

*Primary Examiner* — Lut Wong
(74) *Attorney, Agent, or Firm* — Harrity & Harrity, LLP

(57) ABSTRACT

A device may receive log data from application logs associated with applications, service logs associated with services, and server logs associated with server devices. The device may store the log data. The device may perform natural language processing on the log data to convert the log data into event data identifying events associated with categories. The device may process the event data, with a first machine learning model, to identify patterns in the event data and to generate an alert based on the patterns. The device may process the event data, with a second machine learning model, to generate a correlation matrix for the event data and to predict an event based on the correlation matrix. The device may process the event data, with a third machine learning model, to classify the event data based on the categories and to generate a recommendation based on classifying the event data.

20 Claims, 15 Drawing Sheets

(51) Int. Cl.
*G06F 11/32* (2006.01)
*G06F 18/214* (2023.01)
*G06F 18/243* (2023.01)
*G06F 40/30* (2020.01)
*G06N 5/04* (2023.01)

(56) References Cited

U.S. PATENT DOCUMENTS

| | | | |
|---|---|---|---|
| 2015/0213358 A1* | 7/2015 | Shelton | H04L 41/0636 706/47 |
| 2017/0102997 A1* | 4/2017 | Purushothaman | G06F 11/079 |
| 2019/0026459 A1* | 1/2019 | Harutyunyan | H04L 63/1425 |
| 2019/0327251 A1 | 10/2019 | Muddu | |
| 2019/0377652 A1* | 12/2019 | Sahoo | G06F 11/3447 |

\* cited by examiner

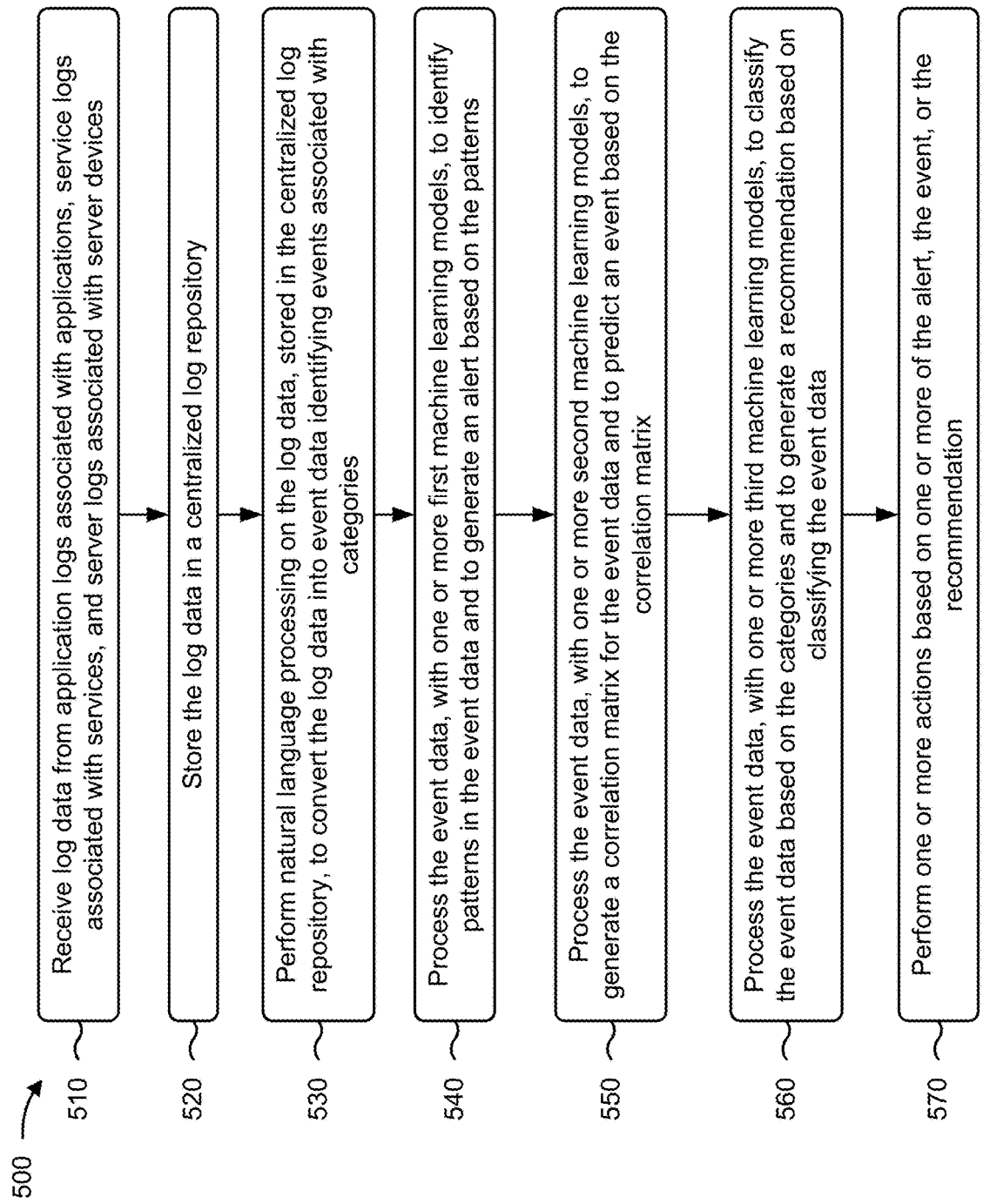

UTILIZING MACHINE LEARNING MODELS WITH A CENTRALIZED REPOSITORY OF LOG DATA TO PREDICT EVENTS AND GENERATE ALERTS AND RECOMMENDATIONS

BACKGROUND

A log file is a file that records log data. The log data may include information associated with an event that occurs in an operating system, an event that occurs during execution of software, messages between different users of communication software, and/or the like.

A customer service team may implement an issue tracking system to facilitate the reporting, management, and resolution of various issues. Implementing an issue tracking system may include generating and updating user tickets to identify the issues and their statuses. A user ticket may include information provided by a user regarding an issue experienced by the user, information provided by the customer service team regarding an action taken to resolve the issue, and/or the like.

SUMMARY

According to some implementations, a method may include receiving log data from application logs associated with applications, service logs associated with services, and server logs associated with server devices, and storing the log data in a centralized log repository. The method may include performing natural language processing on the log data, stored in the centralized log repository, to convert the log data into event data identifying events associated with, and processing the event data, with one or more first machine learning models, to identify patterns in the event data and to generate an alert based on the patterns. The method may include processing the event data, with one or more second machine learning models, to generate a correlation matrix for the event data and to predict an event based on the correlation matrix, and processing the event data, with one or more third machine learning models, to classify the event data based on the categories and to generate a recommendation based on classifying the event data. The method may include performing one or more actions based on one or more of the alert, the event, or the recommendation.

According to some implementations, a device may include one or more memories and one or more processors to receive log data from application logs associated with applications, service logs associated with services, and server logs associated with server devices, and store the log data in a centralized log repository for a predetermined retention time period. The one or more processors may perform natural language processing on the log data, stored in the centralized log repository, to convert the log data into event data identifying events associated with. The one or more processors may selectively process the event data, with one or more first machine learning models, to identify patterns in the event data and to generate an alert based on the patterns, process the event data, with one or more second machine learning models, to generate a correlation matrix for the event data and to predict an event based on the correlation matrix, or process the event data, with one or more third machine learning models, to classify the event data based on the categories and to generate a recommendation based on classifying the event data. The one or more processors may perform one or more actions based on one or more of the alert, the event, or the recommendation.

According to some implementations, a non-transitory computer-readable medium may store one or more instructions that, when executed by one or more processors of a device, may cause the one or more processors to receive log data from application logs associated with applications, service logs associated with services, and server logs associated with server devices, and store the log data in a centralized log repository. The one or more instructions may cause the one or more processors to process the log data, with one or more first machine learning models, to identify patterns in the log data and to generate an alert based on the patterns, and process the log data, with one or more second machine learning models, to generate a correlation matrix for the log data and to predict an event based on the correlation matrix. The one or more instructions may cause the one or more processors to process the log data, with one or more third machine learning models, to classify the log data based on categories and to generate a recommendation based on classifying the log data, and perform one or more actions based on one or more of the alert, the event, or the recommendation.

BRIEF DESCRIPTION OF THE DRAWINGS

FIG. 5 is a flow chart of an example process relating to utilizing machine learning models with a centralized repository of log data to predict events and generate alerts and recommendations.

DETAILED DESCRIPTION

Figure 1A:
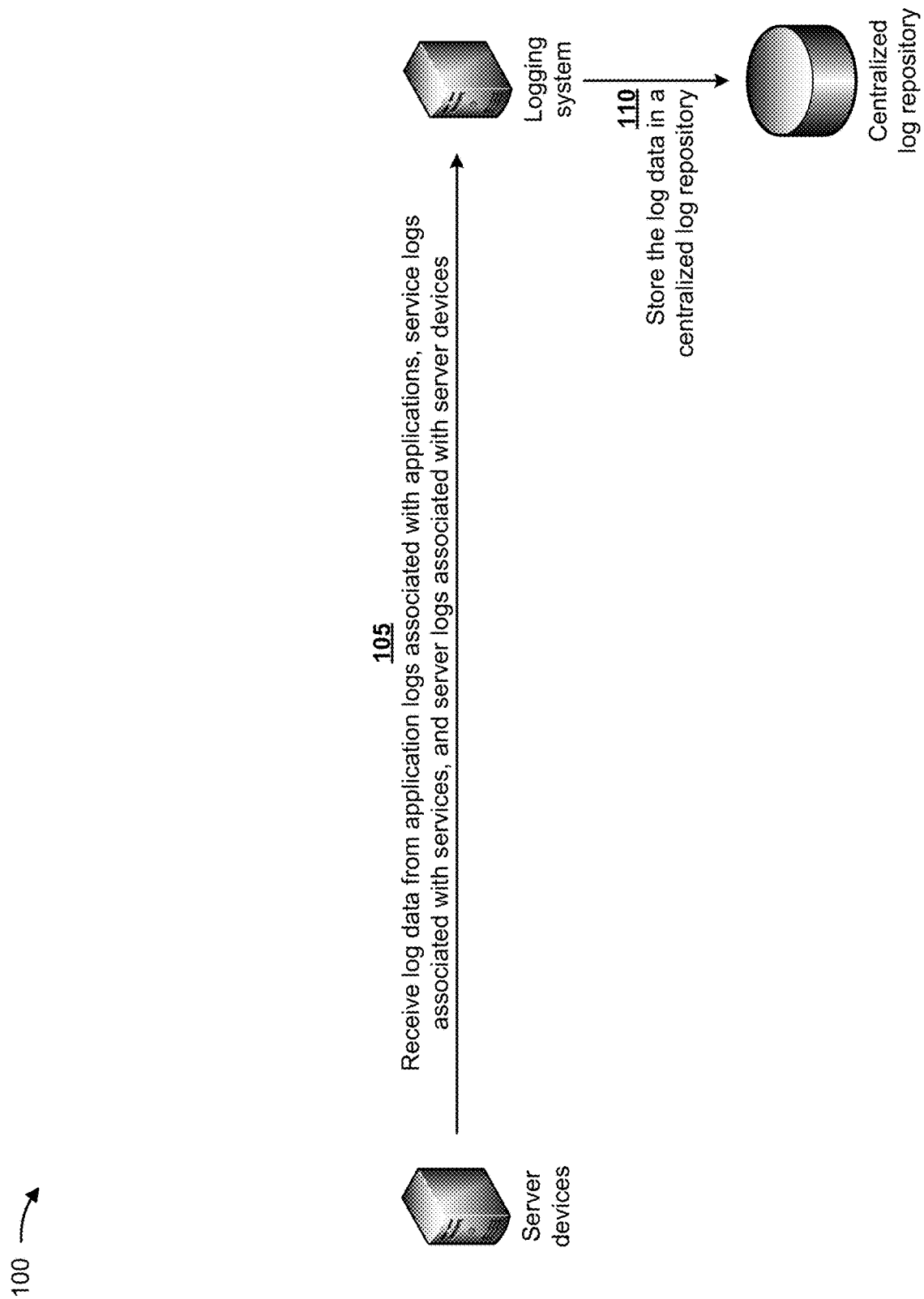
FIGS. 1A-1K are diagrams of one or more example implementations described herein.

The following detailed description of example implementations refers to the accompanying drawings. The same reference numbers in different drawings may identify the same or similar elements.

Applications that run in a server environment may generate logs automatically. The logs may provide information about how a system (e.g., the server environment) is presently operating, how the system has operated in the past, and/or the like. By searching through the log data, a user may be able to identify issues, errors, trends, and/or the like associated with the system. However, the log data may include tens, hundreds, or even thousands of log entries generated by tens, hundreds, or even thousands of applications. Thus, the user may expend countless hours and computing resources (e.g., processing resources, memory resources, communication resources, and/or the like) searching through the logs to identify a particular error, issue, trend, and/or the like associated with a particular application and/or the system.

Further, because the log data may include tens, hundreds, or even thousands of log entries, the user may be unable to identify all of the log data relevant to the particular error, issue, trend, and/or the like. By not identifying all of the relevant log data, the user may not reach a correct conclusion regarding a cause of the particular error, the issue, the trend, and/or the like and/or may cause an action to be performed based on an incomplete set of log data and/or the incorrect conclusion thereby wasting computing resources used to reach the incorrect conclusion and/or perform the action.

Implementations described herein may relate to a logging system that consolidates logs generated by applications in a centralized repository and provides systems and methods for automatically analyzing the logs to identify errors, issues, trends, and/or the like.

For example, the logging system may receive log data from application logs associated with applications, service logs associated with services, and server logs associated with server devices. The logging system may store the log data in a centralized repository. The logging system may perform natural language processing on the log data to convert the log data into event data identifying events associated with categories. The logging system may process the event data, with a first machine learning model, to identify patterns in the event data and to generate an alert based on the patterns. In this way, the logging system may automatically identify patterns associated with applications thereby conserving computing resources that would otherwise have been expended by identifying the patterns manually and/or by utilizing a less efficient system to identify the patterns.

The logging system may process the event data, with a second machine learning model, to generate a correlation matrix for the event data and to predict an event based on the correlation matrix. The logging system may process the event data, with a third machine learning model, to classify the event data based on the categories and to generate a recommendation based on classifying the event data. For example, the logging system may classify the event data as an actionable alert, a predicted event, and/or the like. The logging system may perform an automated action (e.g., causing a server device to restart, causing a new server device to be implemented, causing a robot and/or a technician to be dispatched to address an issue with a server device, and/or the like) based on classifying the event data.

In this way, the logging system may enable events to be automatically predicted and/or may enable actions associated with the predicted events to be automatically performed thereby conserving computing resources that may otherwise have been utilized to manually analyze the log data to predict the events and/or to manually perform the actions.

Further, because the log data may include tens, hundreds, or even thousands of log entries, the user may be able to quickly and efficiently identify all of the log data relevant to the particular error, issue, trend, and/or the like. By identifying all of the relevant log data, the user may reach a correct conclusion regarding a cause of the particular error, the issue, the trend, and/or the like and/or may cause an action to be performed based on an complete set of log data and/or the correct conclusion thereby conserving computing resources that would otherwise be used to reach the incorrect conclusion and/or perform the action based on an incomplete set of log data.

FIGS. 1A-1K are diagrams of one or more example implementations 100 as described herein. As shown in FIGS. 1A-1K, a logging system is associated with a centralized log repository configured to store log data obtained by the logging system from one or more server devices. The logging system may include one or more devices that utilize one or more machine learning models to process the log data stored in the centralized log repository to determine an actionable alert, a predicted event, a recommendation, and/or or the like, as described herein.

As shown in FIG. 1A, and by reference number 105, the logging system receives log data from application logs associated with applications, service logs associated with services, and server logs associated with server devices. The log data may include a plurality of log records. A log record, of the plurality of log records, may be a time-stamped record that includes information associated with an occurrence of an event relevant to an application, a service, a server device, and/or the like. The log record may include information identifying a time associated with the log record (e.g., a time at which the log record was created, a time at which information included in the log record was obtained, and/or the like), information identifying a thread of execution associated with the log record (e.g., a thread identifier), information identifying a category or type associated with the record log (e.g., warning, error, information, and/or the like), log information (e.g., information identifying authentication, authorization, and access data associated with the applications, the services, and the server devices, information identifying threats associated with the applications, the services, and the server devices, information identifying changes associated with the applications, the services, and the server devices, information identifying resource usage associated with the applications, the services, and the server devices, information identifying availability data associated with the applications, the services, and the server devices, and/or the like), and/or the like.

In some implementations, the log data includes user ticket information. A user may experience an issue with an application, a service, a server device, and/or the like. For example, an error may occur while the user is using an application or service, the user may be unable to access the application or service, the user may be unable to retrieve a file stored on a server device, and/or the like. The user may generate and/or submit a user ticket based on experiencing the issue. The user ticket information may include information identifying the user, information identifying the issue experienced by the user, information identifying a date and/or a time associated with the issue, and/or the like. The user ticket may allow a technician or other personnel to address the issue experienced by the user.

In some implementations, the logging system may receive the log data directly from the server devices. For example, the server devices may send the log data to the logging system in near-real time relative to when the log data is generated by the server devices, periodically (e.g., hourly, daily, weekly, and/or the like), based on receiving a request from the logging system, based on a size of a log file storing the log data satisfying a threshold size, and/or the like. Additionally, or alternatively, the logging system may receive the log data from one or more other devices that receive the log data from the server devices; store and/or manage the log data; and provide the log data to the logging system. In this case, the logging system may periodically receive the log data, may receive the log data based on a request, and/or the like.

As shown by reference number 110, the logging system stores the log data in a centralized log repository. The centralized log repository may include one or more devices configured to store log data. For example, the centralized log repository may include a database, a server device, a database server, an application server, a client server, a web server, a host server, a proxy server, a virtual server (e.g., executing on computing hardware), a server in a cloud computing system, a device that includes computing hardware used in a cloud computing environment, and/or the like. By storing the log data in the centralized log repository, the logging system may enable the server devices to conserve memory resources that would otherwise have been used to store the log data, manage the log data, process the log data, and/or the like.

In some implementations, the centralized log repository stores the log data for a predetermined period of time. The logging system may determine a retention policy associated with the log data. The retention policy may indicate that the log data is to be available (e.g., stored in the centralized log repository) for a predetermined period of time (e.g., a day, a week, a month, a year, and/or the like). The logging system may enforce the retention policy on the log data by causing the centralized log repository to store the log data for the predetermined period of time and to delete (or cause to be deleted) the log data after the predetermined period of time.

In some implementations, the logging system determines the predetermined period of time based on a plurality of retention policies. The logging system may determine a plurality of periods of time associated with retention policies associated with the log data. For example, the logging system may determine one or more periods of time associated with one or more retention policies associated with the application logs, one or more periods of time associated with one or more retention policies associated with the service logs, one or more periods of time associated with one or more retention policies associated with the server logs, and/or one or more periods of time associated with one or more retention policies associated with the user tickets. The logging system may determine the period of time for which the centralized log repository is to store the log data based on the plurality of periods of time. For example, the logging system may determine the period of time for which the centralized log repository is to store the log data based on a longest period of time of the plurality of periods of time, an average of the plurality of periods of time, and/or the like.

Figure 1B:
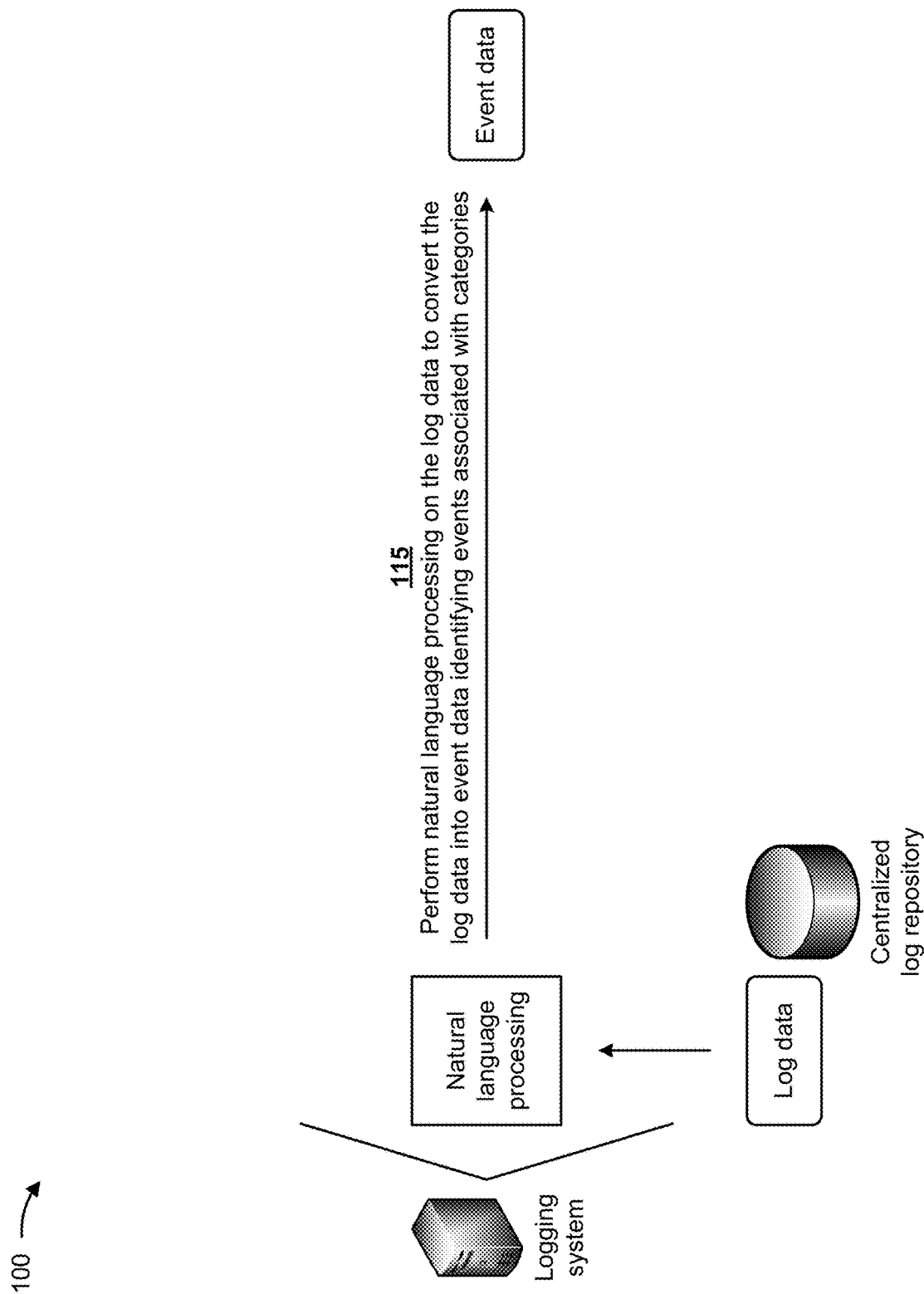

As shown in FIG. 1B, and by reference number 115, the logging system performs natural language processing (NLP) on the log data to convert the log data into event data identifying events associated with categories. The log data may include a plurality of log records in a plurality of different formats. For example, log data associated with a first application may be in a first format, log data associated with a second application may be in a second format, log data associated with a first service may be in a third format, log data associated with a second service may be in a fourth format, log data received from a first server device may be in a fifth format, log data received from a second server device may be in a sixth format, and/or the like. Any one of the first format, the second format, the third format, the fourth format, the fifth format, or the sixth format may be different from any other one of the first format, the second format, the third format, the fourth format, the fifth format, or the sixth format. Similarly, any one of the first format, the second format, the third format, the fourth format, the fifth format, or the sixth format may be the same as any other one of the first format, the second format, the third format, the fourth format, the fifth format, or the sixth format. The logging system may perform NLP on the log data to determine information included in the log data regardless of the format of the log data.

For example, the logging system may perform NLP on the log data to identify information indicating an event associated with an application, a service, and/or a server device (e.g., information identifying a debug event associated with debugging an application, a service, and/or a server device, information identifying a warning event associated with an application, a service, and/or a server device (e.g., information identifying that an amount of available memory fails to satisfy a threshold amount of memory), information identifying a critical event associated with an application, a service, or a server device (e.g., information indicating a failure of the application, the service, and/or the server device), information identifying an information event associated with an application, a service, or a server device (e.g., information indicating an addition of a new user), information identifying an error event associated with an application, a service, or a server device, and/or the like by using a set of NLP techniques to analyze a log record included in the log data.

In some implementations, the logging system may perform preprocessing based at least in part on a natural language processing technique. For example, the logging system may convert text to lowercase, remove punctuation, remove stop words, strip white space, perform stemming, perform lemmatization, spell out abbreviations and acronyms, and/or the like. In some implementations, the logging system may remove sparse words, such as words that are uncommon (e.g., according to a domain-specific corpus, and/or the like). Preprocessing for natural language processing may improve accuracy of natural language processing and conserve computing resources that would otherwise have been used to perform natural language processing in a less efficient fashion for an un-preprocessed data set.

In some implementations, logging system may execute a first NLP technique for analyzing unstructured documents. For example, the logging system may analyze unstructured log data using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, the logging system may analyze structured log data using a second NLP technique (e.g., a metadata-based NLP technique and/or a similar type of technique).

In some implementations, the logging system may execute a token-based NLP technique, such as a technique using regular expressions, to identify the event. For example, the logging system may reference a data structure that stores regular expressions that may be used to identify the event associated with the log record (e.g., unable to connect, service stopped, automatic restart, and/or the like). The logging system may use the regular expressions to identify the event based on comparing the regular expressions and information included in the log record.

Additionally, or alternatively, the logging system may execute an approximation-based NLP technique, such as a fuzzy text search technique, to identify the occurrence of the event. For example, the logging system may execute an approximation-based NLP technique to identify log data that satisfies a threshold level of similarity with log data stored in a data structure. In this case, the logging system may set a threshold level of similarity (e.g., a percentage, a number of characters, and/or the like), and may compare information included in the log data to information stored in the data structure. If the logging system determines that the threshold level of similarity is satisfied, the logging system may identify the information as information identify the event.

In some implementations, the logging system may use multiple NLP techniques, and may filter outputs of the multiple NLP techniques into the set of values identifying the event. For example, the logging system may identify a first set of values using a first one or more NLP techniques.

Additionally, the logging system may identify a second set of values using a second one or more NLP techniques. In some implementations, a mixture of overlapping values and conflicting values may occur. In these implementations, the logging system may address the conflicting values by filtering the first set of values and the second set of values into a third set of values that excludes duplicate values, resolves conflicting values (e.g., by selecting one value, of two conflicting values, using a rule, such a threshold), and/or the like. The logging system may use the third set of values as the set of values identifying the event.

In some implementations, the logging system may execute one or more of the above-mentioned NLP techniques on a particular type of log record, on a log record received from a particular server device, on a particular field or group of fields within the log record, and/or the like. Additionally, or alternatively, the logging system may take an average, or a weighted average, of the outputs of the one or more NLP techniques being deployed to identify the event. As an example, the logging system may assign a weight to an output associated with each additional NLP technique and may take an average or a weighted average to identify the event.

The event data may include information associated with an event. For example, the event data may include information identifying a debug event associated with debugging one of the applications, the services, or the server devices, information identifying a warning event associated with one of the applications, the services, or the server devices, information identifying a critical event associated with one of the applications, the services, or the server devices, information identifying an information event associated with one of the applications, the services, or the server devices, information identifying an error event associated with one of the applications, the services, or the server devices, and/or the like.

The logging system may determine a category associated with the event. In some implementations, the logging system may access a data structure (e.g., a database, a list, a table, and/or the like) storing information associating events with categories. The logging system may determine a category associated with the event based on the information stored in the data structure. In some implementations, the logging system may determine a category associated with the event using machine learning. For example, the logging system may train a machine learning model to determine a category associated with an event. The machine learning model may be trained based on historical data relating to events and historical data relating to categories with which those events are associated. The machine learning model may be trained to determine, based on information regarding an event, a category with which the event is associated and a confidence score that reflects a measure of confidence that the category is accurate for this event. In some implementations, the logging system trains the machine learning model in a manner similar to that described below with respect to FIG. 2.

The logging system may convert the log record into event data by associating the log record with information identifying the event and/or information identifying the category associated with the event. For example, the logging system may associate the log record with metadata identifying the event and/or the category associated with the event, may generate a table that includes information associating the log record with the event and/or the category associated with the event, and/or the like.

Figure 1C:
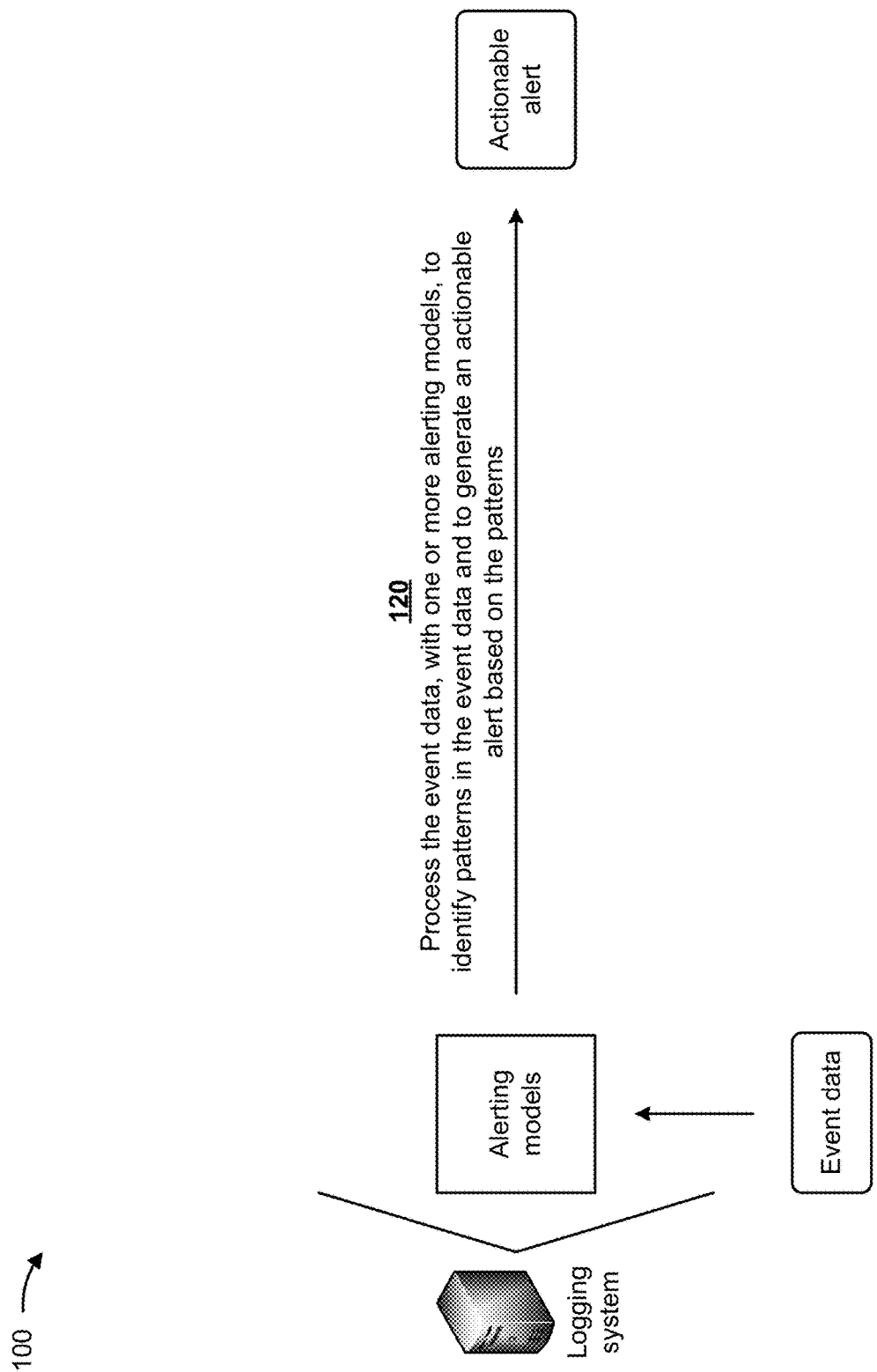

As shown in FIG. 1C, and by reference number 120, the logging system processes the event data with one or more alerting models to identify patterns in the event data and to generate an actionable alert based on the patterns. For example, the one or more alerting models may include a support vector machine model, a random forest model, a Monte Carlo tree search model, a temporal difference model, and/or the like. In some implementations, the logging system may train the one or more alerting models to identify patterns in the event data and/or to generate the actionable alert. The one or more alerting models may be trained based on historical data relating to events and historical data relating to patterns with which those events are associated. The one or more alerting models may be trained to determine, based on information regarding a series of events, a pattern with which the series of events are associated, a confidence score that reflects a measure of confidence that the identified pattern is accurate for this series of events, an actionable alert associated with the pattern, and a confidence score that reflects a measure of confidence that the actionable alert is accurate for this pattern. In some implementations, the logging system trains the one or more alerting models in a manner similar to that described below with respect to FIG. 2.

The logging system may identify an application behavior pattern based on the event data. In some implementations, the application behavior pattern includes a repeated occurrence (e.g., hourly, daily, weekly, a number of times in a time period, and/or the like) of an application behavior (e.g., a service failure, an error, an automatic restart of a device, a service, and/or an application, and/or the like). The logging system may determine the repeated occurrence of the application behavior based on analyzing event data associated with a category (e.g., an error category, an application restart category, and/or the like). The logging system may identify a set of event data associated with the application behavior. The set of event data may include information indicating a time and/or date at which multiple instances of the application behavior occurred. The logging system may determine the application behavior pattern based on the information indicating the time and/or date at which the multiple instances of the application occurred. For example, the logging system may determine that the application behavior occurs hourly, daily, weekly, a number of times within a time period, and/or the like.

In some implementations, the application behavior pattern includes a set of conditions and/or a set of events resulting in an occurrence of the application behavior. As an example, the set of conditions may include a memory capacity of a server device being exceeded, the set of events may include receiving a quantity of requests to store data during a period of time at which the memory capacity is exceeded, and the application behavior may include the server device generating an error associated with the quantity of requests to store data. The logging system may determine the set of conditions associated with the application behavior and/or the set of events likely to have caused the application behavior based on analyzing event data associated with a date category associated with a date associated with the application behavior, an informational category (e.g., a category associated with event data associated with information related to computing resources being utilized by the server device during a period of time associated with the application behavior, event data associated with information indicating a quantity of requests to store data received by the server device during the period of time at which the memory capacity was exceeded, and/or the like), and/or the like.

The logging system may generate an actionable alert based on identifying the application behavior pattern. The actionable alert may include information indicating the application behavior pattern, information indicating an action for resolving an issue resulting from an occurrence of the application behavior, information indicating an action for preventing the occurrence of the application behavior, and/or the like.

In some implementations, the logging system generates the actional alert based on historical data associated with the application behavior. The logging system may identify event data associated with resolving the issue resulting from the occurrence of the application behavior based on the categories associated with the event data. For example, the logging system may identify event data associated with a resolution category that includes information associated with actions taken to resolve various issues. The logging system may analyze the event data included in the resolution category to identify event data that includes information identifying actions taken to resolve the issue resulting from the occurrence of the application behavior. The logging system may generate the actionable alert based on the information identifying the actions taken to resolve the issue resulting from the occurrence of the application behavior.

Figure 1D:
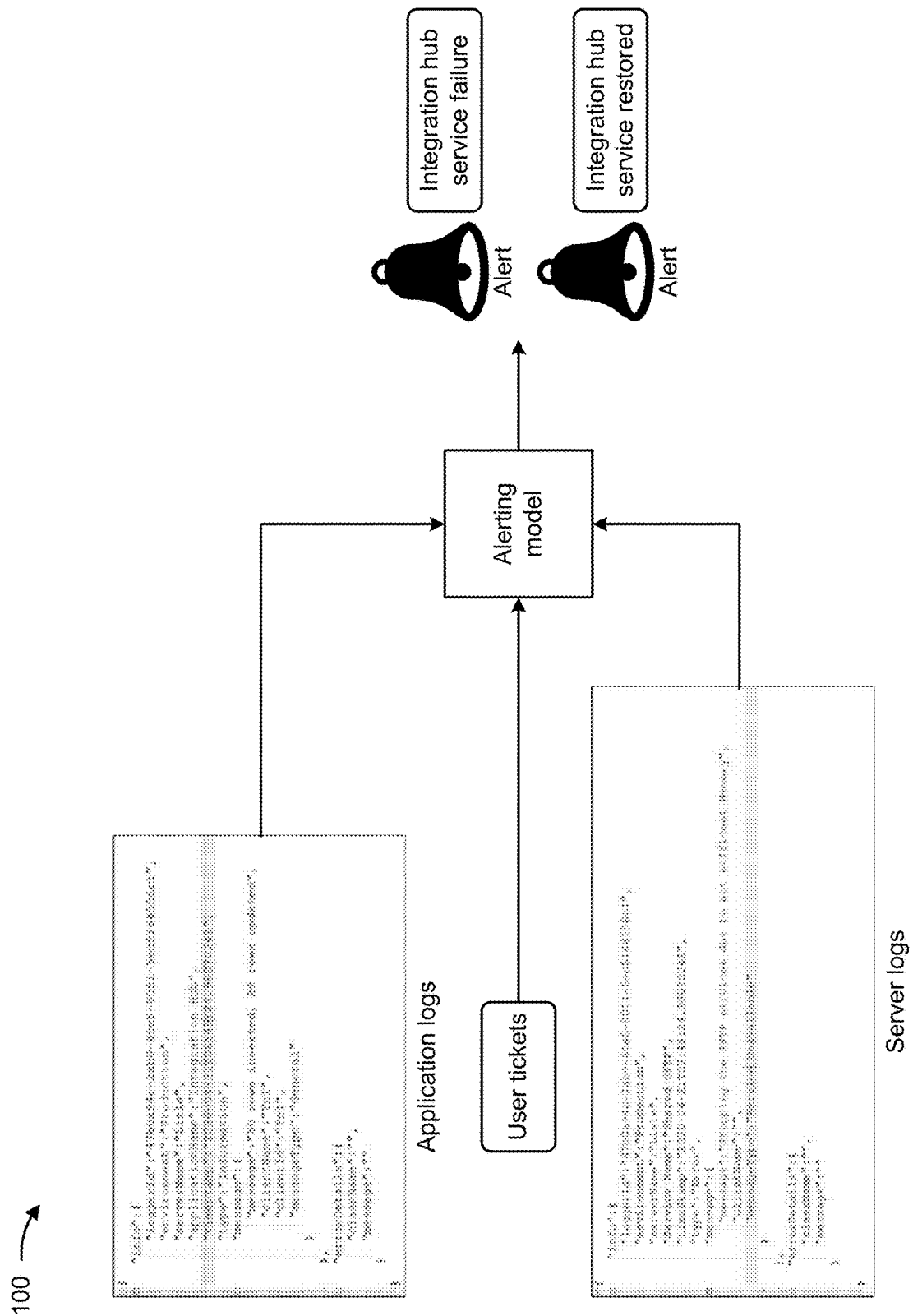

FIG. 1D is a diagram illustrating an example of using an alerting model to identify application behavior patterns based on the event data. As shown in FIG. 1D, the alerting model receives event data generated based on log data from application logs, event data generated based on log data from user tickets, and event data generated based on log data from server logs as inputs. The alerting model processes the input event data to identify an application behavior pattern (e.g., an integration hub service failure, as shown in FIG. 1D) and generates an alert based on identifying the application behavior pattern. Subsequently, the alerting model may process additional event data to identify another application behavior pattern (e.g., integration hub service restored, as shown in FIG. 1D). The alerting model generates another alert indicating the other application behavior pattern based on identifying the other application behavior pattern.

Figure 1E:
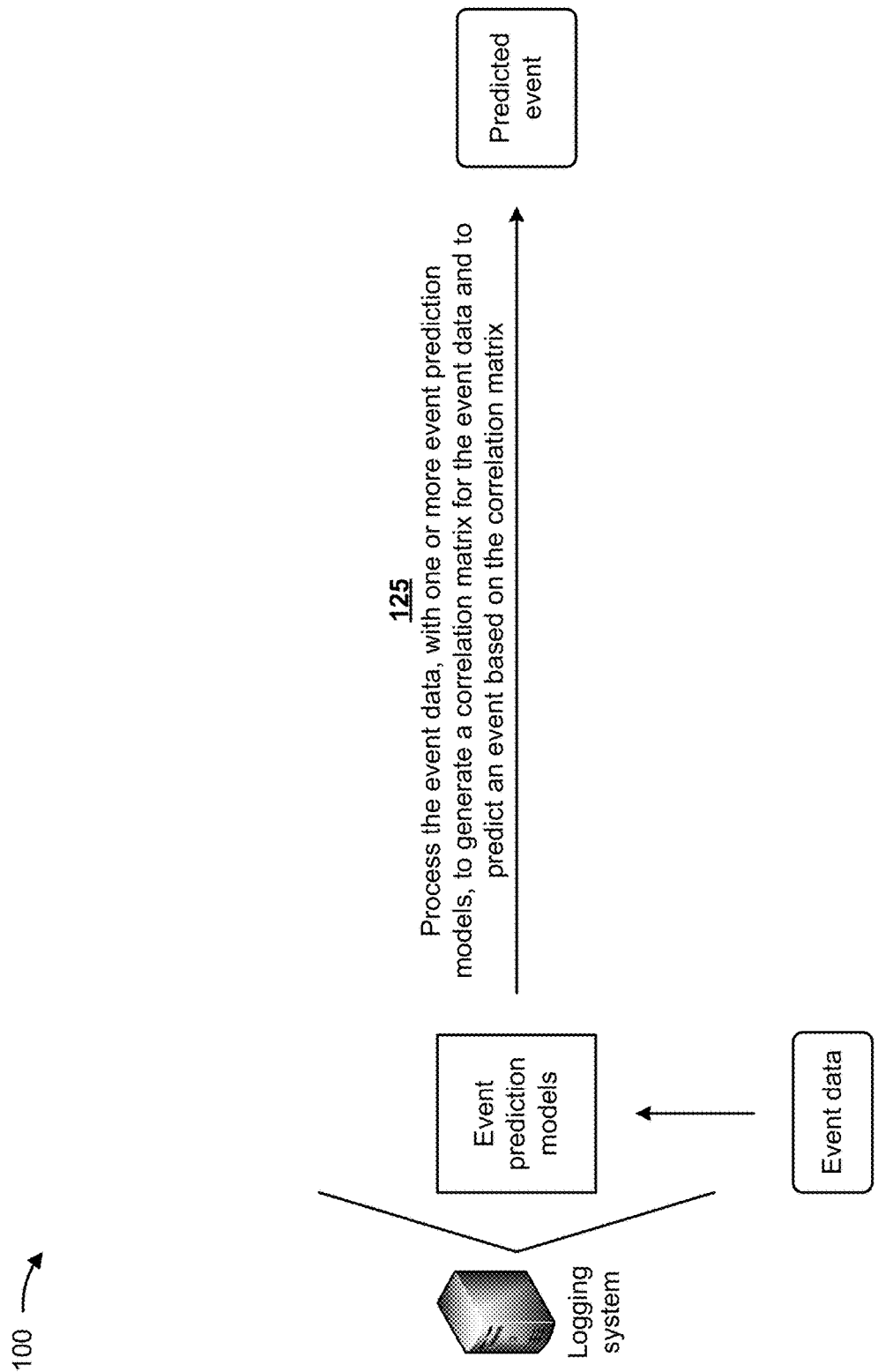

As shown in FIG. 1E, and by reference number 125, the logging system processes the event data with one or more prediction models to generate a correlation matrix for the event data and to predict an event based on the correlation matrix. For example, the one or more prediction models may include a support vector machine model, a random forest model, an auto regressive integrated moving average (ARIMA) model, a seasonal ARIMA model, a vector autoregressive moving average with exogenous regressors model, and/or the like.

In some implementations, the logging system may train the one or more prediction models to generate a correlation matrix and/or to predict events based on the correlation matrix. The one or more prediction models may be trained based on historical data relating to events, historical data relating to correlation matrixes, and historical data relating to predicting events based on the correlation matrix. The one or more prediction models may be trained to generate, based on information regarding a group of events, a correlation matrix with which the group of events are associated, a confidence score that reflects a measure of confidence that the correlation matrix is accurate for this group of events, a prediction of an event based on the correlation matrix, and a confidence score that reflects a measure of confidence that the prediction is accurate for this group of events. In some implementations, the logging system trains the one or more prediction models in a manner similar to that described below with respect to FIG. 2.

The logging system may identify event data associated with an occurrence of a particular type of event (e.g., a service failure event, application failure event, server device failure event, and/or the like) based on the event data. The logging system may identify a category of event data associated with the particular type of event. The logging system may identify the occurrence of the particular type of event based on the event data associated with the identified category. The logging system may determine a category associated with an impact that an occurrence of the particular type of event had on a user. The logging system may analyze the event data associated with the category to determine user impact data associated with the occurrence of the particular type of event. For example, the logging system may analyze the event data to determine a quantity of users unable to access an application based on the occurrence of the particular type of event, a service failure experienced by a user based on the occurrence of the particular type of event, a data loss experienced by a user based on the occurrence of the particular type of event, and/or the like.

The logging system may identify correlations and seasonal variations (e.g., a day that the particular type of event occurred, a time that the particular type of event occurred, and/or the like) in the identified event data and the impact data. The logging system may determine the correlations based on determining a series of events and/or conditions that resulted in the occurrence of the particular type of event. As an example, the logging system may identify a time associated with the occurrence of the particular type of event, an application associated with the occurrence of the particular type of event, a service associated with the occurrence of the particular type of event, a server device associated with the occurrence of the particular type of event, and/or the like. The logging system may identify event data associated with the time associated with the occurrence of the particular type of event, event data associated with the application associated with the occurrence of the particular type of event, event data associated with the service associated with the occurrence of the particular type of event, event data associated with the server device associated with the occurrence of the particular type of event, and/or the like based on the categories associated with the event data. The logging system may determine the series of events and/or the conditions resulting in the occurrence of the particular type of event based on the identified event data.

The logging system may generate the correlation matrix based on the correlations and the seasonal variations in the event data and the impact data. The correlation matrix may identify relationships between event data generated based on the log data from the application logs, the event data generated based on the log data from the service logs, and/or the event data generated based on the log data from the server logs.

The logging system may predict an occurrence of the particular type of event based on the correlation matrix. The logging system may determine the series of events and/or the conditions resulting in the occurrence of the particular type of event based on the correlation matrix. The logging system may determine an occurrence of the series of events and/or the conditions resulting in the occurrence of the particular type of event based on the event data. The logging system may predict the occurrence of the particular type of event based on the occurrence of the series of events and/or the conditions resulting in the occurrence of the particular type of event.

Figure 1F:
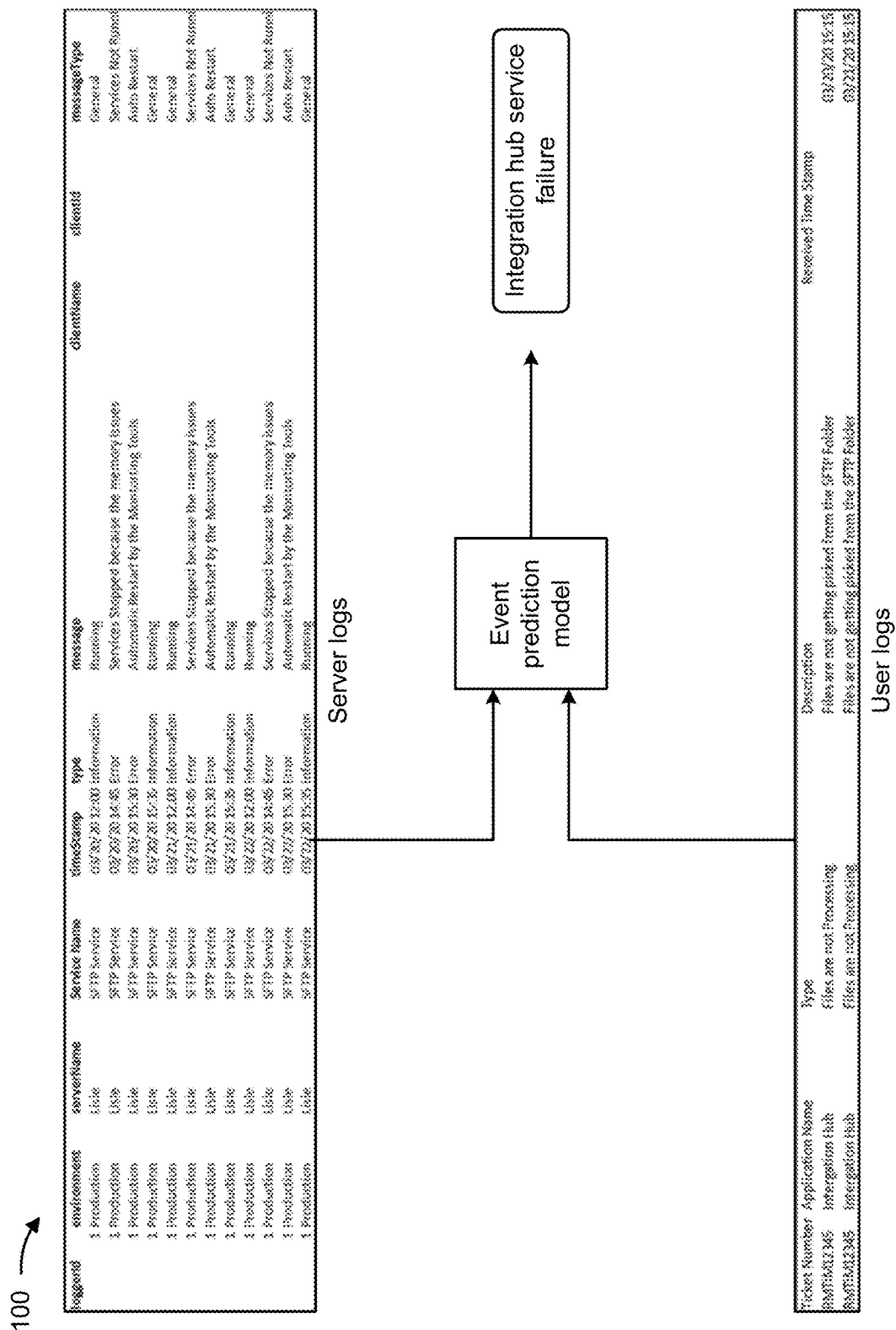

As shown in FIG. 1F, the logging system identifies event data associated with an occurrence of a service failure (e.g., an integration hub service failure, as shown in FIG. 1F). The logging system determines user impact data associated with the occurrence of the service failure (e.g., files are not getting picked from the SFTP folder, as shown in FIG. 1F). The event prediction model may receive the event data and the user impact data as an input and may determine that the service failure occurs daily at a particular time (e.g., 14:45, as shown in FIG. 1F) based on a memory issue. The event prediction model may predict that the service failure is likely to occur daily at the particular time as a result of the memory issue. The logging system may output a notification indicating the predicted event and/or the memory issue, may cause one or more actions for addressing the memory issue to be automatically performed, and/or the like.

Figure 1G:
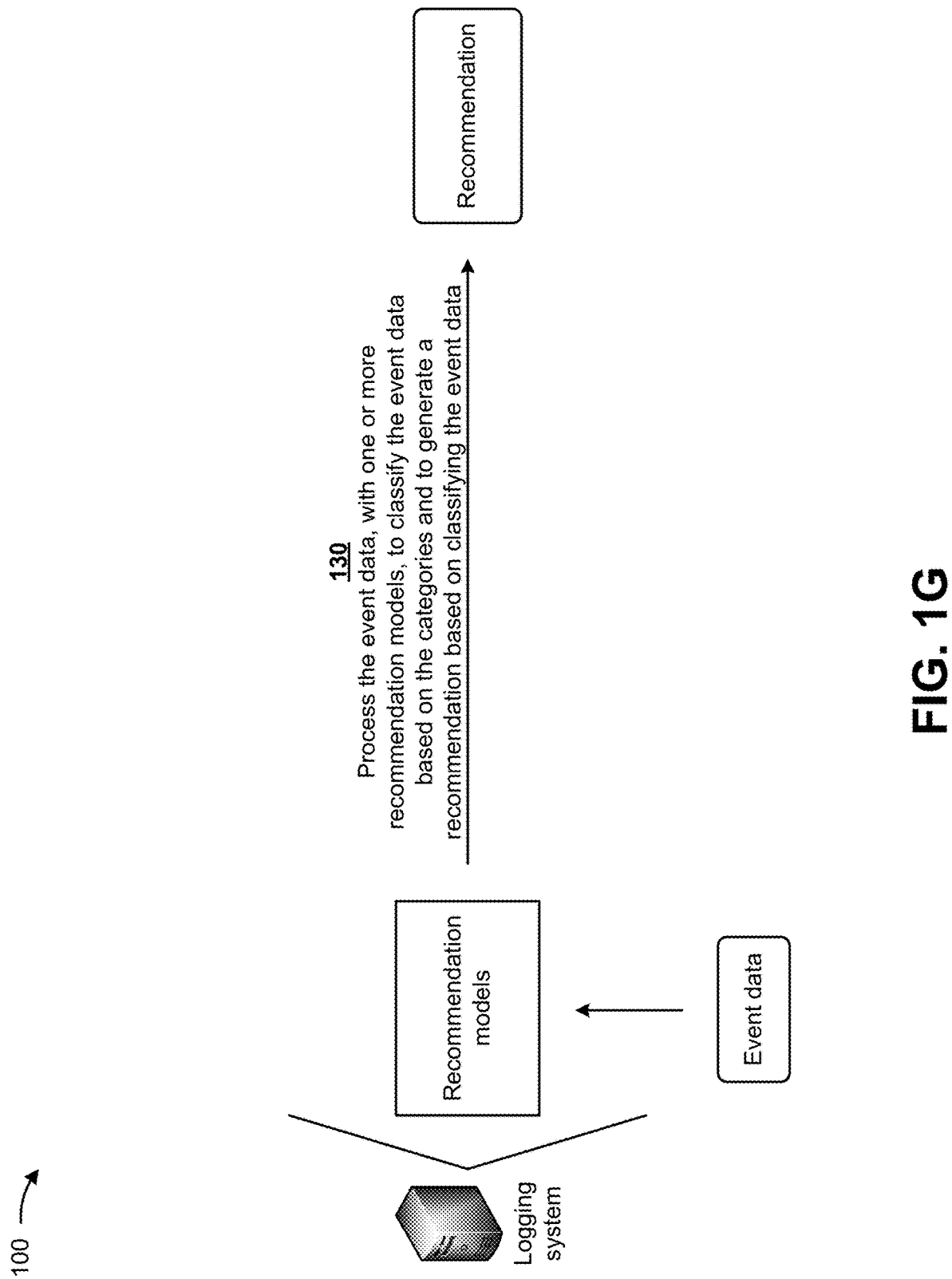

As shown in FIG. 1G, and by reference number 130, the logging system processes the event data with one or more recommendation models to classify the event data based on the categories and to generate a recommendation based on classifying the event data. For example, the one or more recommendation models may include a support vector machine model, a random forest model, a Monte Carlo tree search model, a temporal difference learning model, a dynamic sentence generation model, and/or the like.

In some implementations, the logging system may train the one or more recommendation models to identify classify the event data and/or to generate the recommendation. The one or more recommendation models may be trained based on historical data relating to events and historical data relating to classifications with which those events are associated. The one or more recommendation models may be trained to determine, based on information regarding an event, a classification with which the event is associated, a confidence score that reflects a measure of confidence that the classification is accurate for this event, a recommendation associated with classifying the event, and a confidence score that reflects a measure of confidence that the recommendation is accurate for this classification of the event. In some implementations, the logging system trains the one or more recommendation models in a manner similar to that described below with respect to FIG. 2.

The logging system may classify the event data into categories based on the categories associated with the event data. For example, the logging system may classify the event data into an authentication, authorization, and access category based on the event data being associated with a category related to authentication (e.g., event data associated with an authentication of a user), authorization (e.g., event data associated with an authorization of a user to access an application or service), and/or access (e.g., event data associated with a user accessing an application or service); a category related to threats (e.g., event data related to a security issue, a malicious attack, an invalid input, and/or the like), a category related to changes (e.g., event data related to a change to a configuration of an application or a service, event data related to a change or modification made to data stored on a server device, event data related to an installation or removal of an application or service, and/or the like), an availability category (e.g., event data associated with a startup of an application or service, event data associated with a shutdown of an application or service, event data associated with a fault or an error that affects an availability of an application or service, event data associated with a process to backup a server device, and/or the like), a resource category (e.g., event data associated with computing resources utilized by an application or service), and/or the like. The above-listed categories are intended to be merely examples of types of categories that may be used. In practice, the categories may include any one or more of the above-listed categories and/or one or more other types of categories not listed above.

The logging system may identify correlations between events based on classifying the event data into the categories. As an example, the logging system may identify correlations between an occurrence of a service failure, application response times associated with the service, and hardware metrics of a server device associated with the service based on classifying the event data into the categories. The logging system may generate the recommendation based on the correlations between the occurrence of the service failure, the application response times, and the hardware metrics of the server device.

Alternatively, and/or additionally, the logging system may identify a resolution associated with an occurrence of similar event based on classifying the event data into the categories. The logging system may identify event data associated with a resolution of the similar event (e.g., based on classifying the event data in a resolution category). The logging system may generate the recommendation based on the resolution associated with the similar event. For example, the logging system may generate a recommendation that includes information identifying steps taken to resolve the occurrence of the similar event.

Figure 1H:
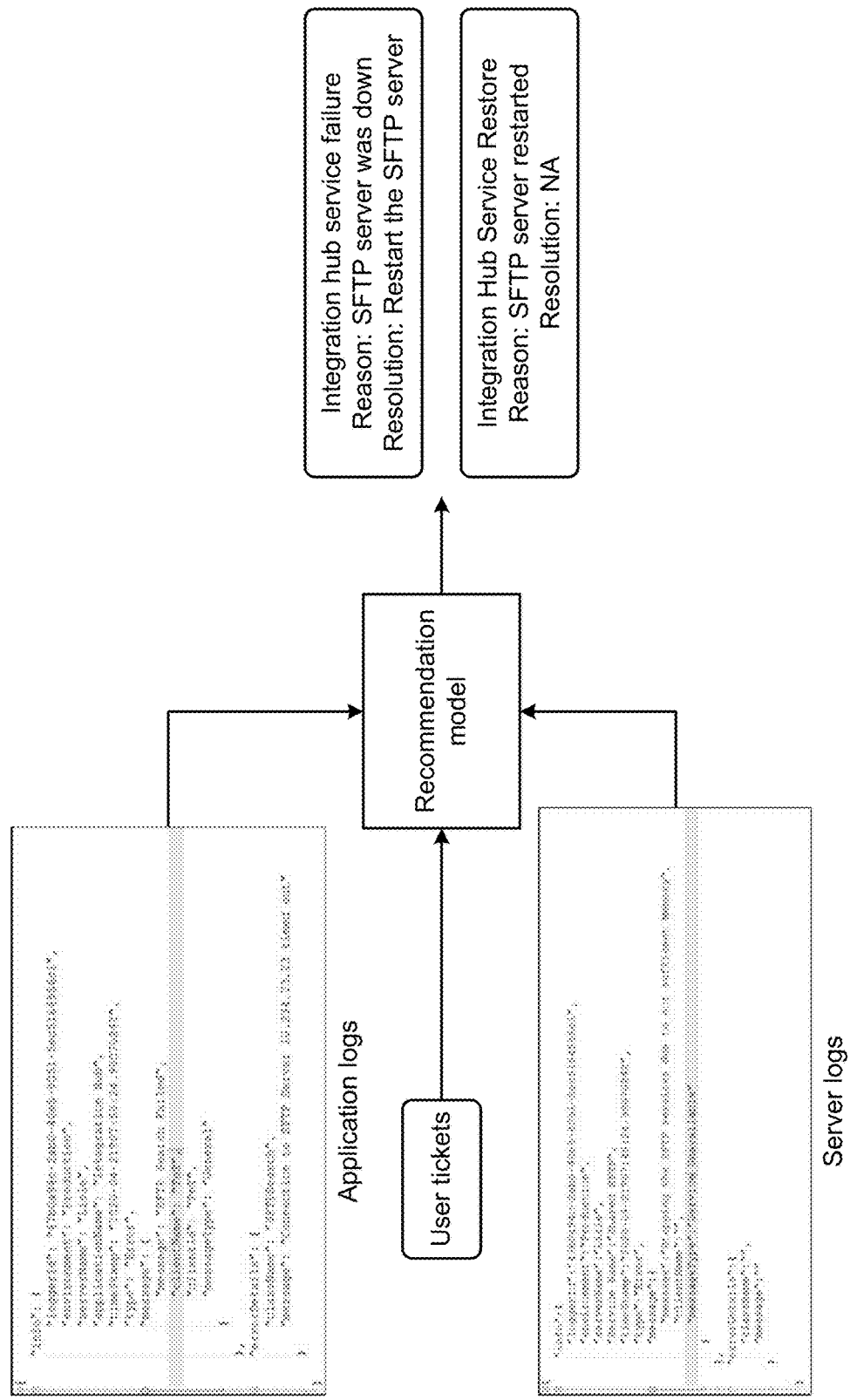

As shown in FIG. 1H, the recommendation model receives event data generated based on log data from application logs, event data generated based on log data from user tickets, and event data generated based on log data from server logs as an input. The recommendation model processes the input event data to determine a recommendation. As shown in FIG. 1H, the recommendation includes information identifying an occurrence of an event (e.g., an integration hub service failure, as shown in FIG. 1H), information identifying a reason for the occurrence of the event (e.g., SFTP server was down, as shown in FIG. 1H), and information identifying a resolution associated with the occurrence of the event (e.g., restart the SFTP server, as shown in FIG. 1H). As further shown in FIG. 1H, the recommendation model generates a second recommendation based on determining that an issue associated with the occurrence of the event is resolved. As shown in FIG. 1H, the second recommendation includes information identifying the occurrence of a subsequent event (e.g., integration hub service restore, as shown in FIG. 1H) and information associated with a cause of the occurrence of the subsequent event (e.g., SFTP server restarted, as shown in FIG. 1H).

Figure 1I:
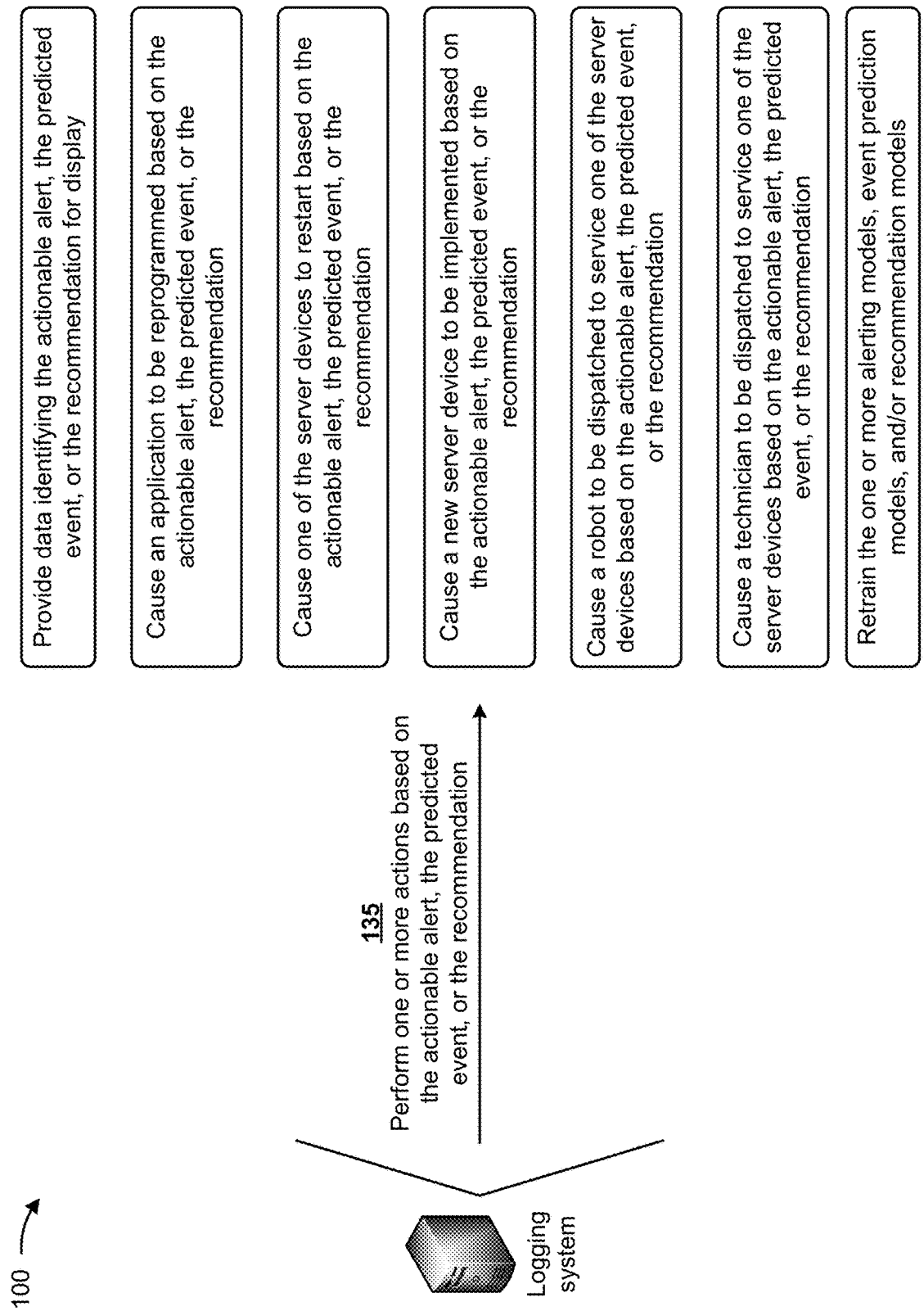

As shown in FIG. 1I, and by reference number 135, the logging system performs one or more actions based on the actionable alert, the predicted event, and/or the recommendation. In some implementations, the one or more actions include providing data identifying the actionable alert, the predicted event, and/or the recommendation for display. In some implementations, the logging system provides the data identifying the actionable alert, the predicted event, and/or the recommendation for display via a user interface. The logging system may generate a user interface that includes a dashboard (as described in greater detail below with respect to FIGS. 1J and 1K) displaying the actionable alert, the predicted event, and/or the recommendation. The logging system may provide the user interface for display (e.g., via a user device associated with the logging system).

In some implementations, the one or more actions include causing an application to be reprogrammed based on the actionable alert, the predicted event, and/or the recommendation. For example, the logging system may automatically cause the application to be reprogrammed, may provide a notification to a user indicating that the application is to be reprogrammed, and/or the like based on the actionable alert, the predicted event, and/or the recommendation indicating an issue with the server devices.

In some implementations, the one or more actions include causing one of the server devices to restart based on the actionable alert, the predicted event, and/or the recommendation. For example, the logging system may automatically restart a server device based on the actionable alert, the predicted event, and/or the recommendation indicating an issue with the server device. In this way, the logging system may automatically address issues with the server device thereby conserving resources that would otherwise have been utilized manually restarting the server device and/or interacting with a server device that needs to be restarted.

In some implementations, the one or more actions include causing a new server device to be implemented based on the actionable alert, the predicted event, and/or the recommendation. For example, the logging system may send a notification to a technician and/or a robot to cause a new server device to be implemented based on the actionable alert, the predicted event, and/or the recommendation. In this way, the logging system may reduce a load on existing server devices, reduce a number of negative events, enable tasks to be handled more efficiently, and/or the like.

In some implementations, the one or more actions include causing a robot to be dispatched to service one of the server devices based on the actionable alert, the predicted event, and/or the recommendation. For example, the logging system may cause a robot to be dispatched to service a server device based on the actionable alert, the predicted event, and/or the recommendation indicating an issue with the server device. In this way, the logging system may automatically address issues with server devices thereby conserving resources that would otherwise have been utilized manually addressing the issue with the server device.

In some implementations, the one or more actions include causing a technician to be dispatched to service one of the server devices based on the actionable alert, the predicted event, and/or the recommendation. For example, the logging system may cause a technician to be dispatched to service a server device based on the actionable alert, the predicted event, and/or the recommendation indicating an issue with the server. In this way, the logging system may quickly and efficiently arrange and dispatch personnel necessary to address an issue with a server device, thereby conserving resources that would otherwise have been wasted arranging for and dispatching personnel.

In some implementations, the one or more actions include retraining the one or more alerting models, the one or more prediction models, and/or the one or more recommendation models. For example, the logging system may retrain the one or more alerting models, the one or more prediction models, and/or the one or more recommendation models based on the actionable alert, the predicted event, and/or the recommendation. In this way, the logging system may improve an accuracy of the one or more alerting models, the one or more prediction models, and/or the one or more recommendation models in determining the actionable alert, the predicted event, and/or the recommendation which may improve speed and efficiency of the machine learning models and conserve computing resources, networking resources, and/or the like relative to slower and less efficient systems.

Figure 1J:
Figure 1K:
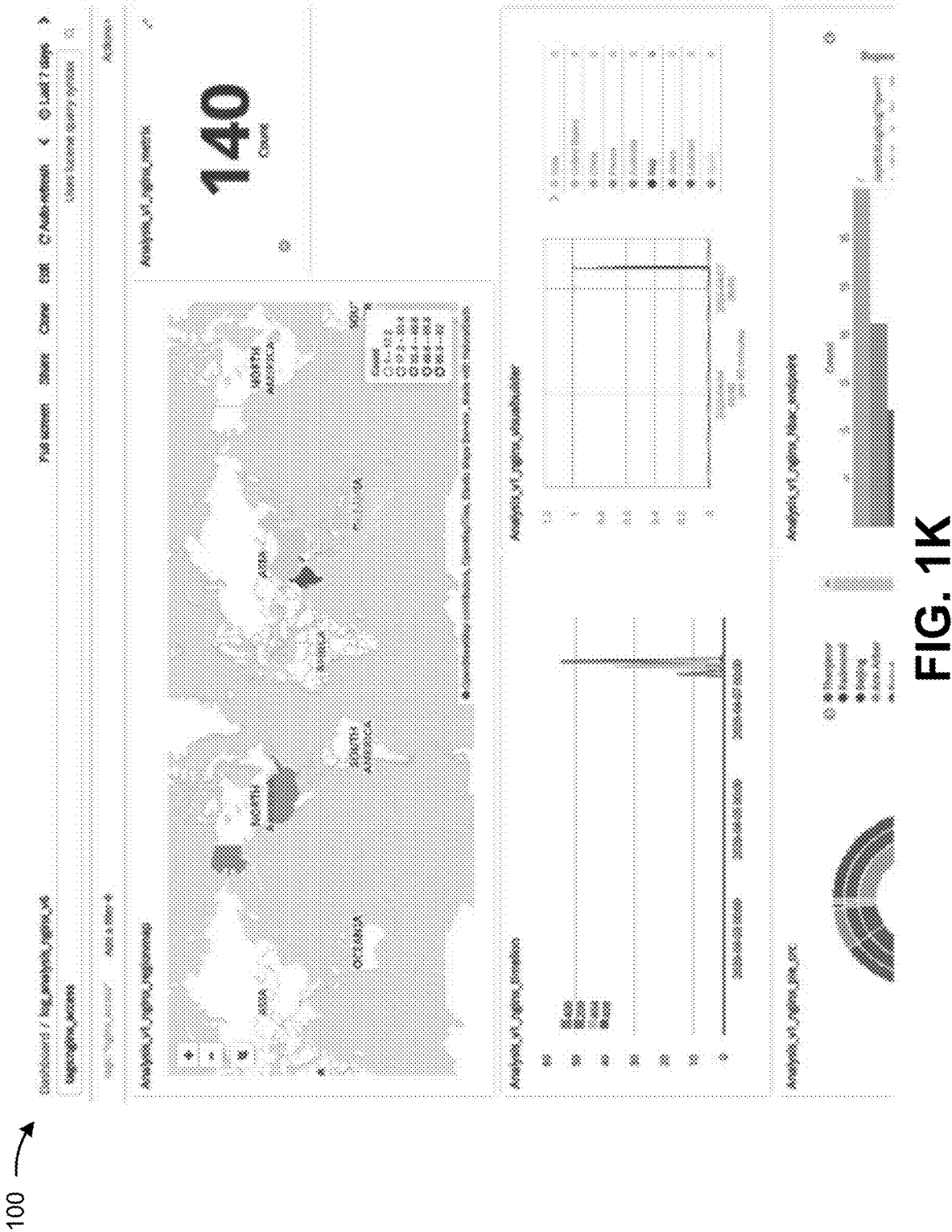

FIGS. 1J and 1K are diagrams of user interfaces that include dashboards displaying the actionable alert, the predicted event, and/or the recommendation. As shown in FIG. 1J, the dashboard may include a search field. The search field may enable a user to quickly and efficiently access log data, event data, actionable alerts, predicted events, and/or recommendations associated with a server device, an application, a service, and/or the like. The user may input search information (e.g., information identifying a date, information identifying an application, information identifying a service, information identifying a server device, information identifying an event, and/or the like) into the search field. The logging system may utilize the search information to identify log data, event data, actionable alerts, predicted events, and/or recommendations associated with a server device, an application, a service, and/or the like associated with the search information. The logging system may provide the identified log data, event data, actionable alerts, predicted events, and/or recommendations associated with a server device, an application, a service, and/or the like for display via the dashboard. In this way, a user may quickly and efficiently identify relevant log data, event data, actionable alerts, predicted events, and/or recommendations associated with a server device, an application, a service, and/or the like thereby conserving computing resources that would otherwise be utilized to search the log data for the relevant information in a less efficient manner.

As shown in FIG. 1K, the logging system displays a map indicating a quantity of events associated with various locations, a chart indicating a quantity of events occurring on a particular date, a chart indicating a quantity of events occurring on a particular date for a particular location, and/or the like. In this way, a user may quickly and efficiently identify locations associated with various occurrences of events.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
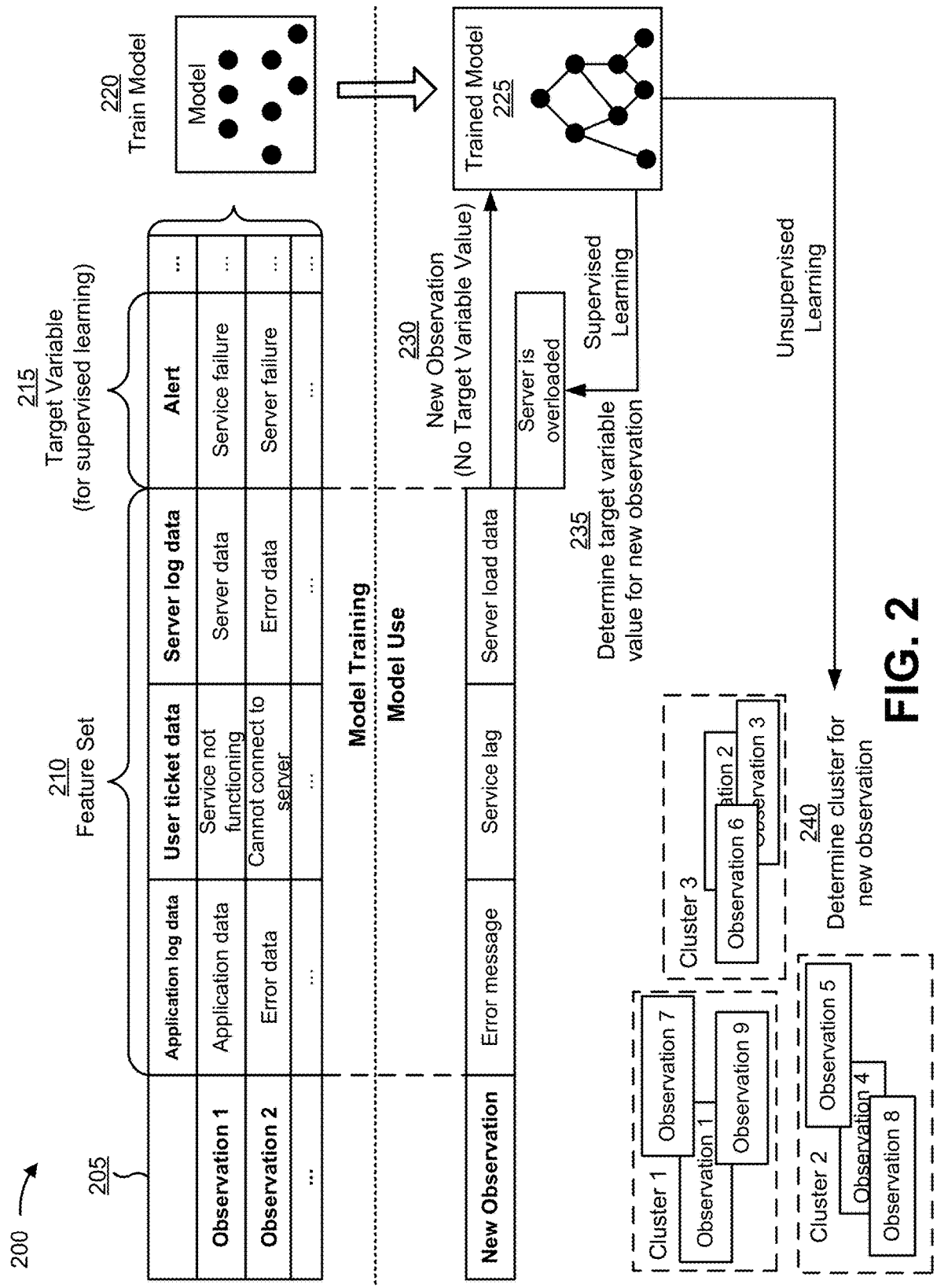
FIG. 2 is a diagram illustrating an example of training and using a machine learning model in connection with processing log data to predict events and generate alerts.

FIG. 2 is a diagram illustrating an example 200 of training and using a machine learning model in connection with processing log data to identify patterns in the event data, generate actionable alerts, generate a correlation matrix, predict events, classify event data, and/or generate recommendations. The machine learning model training and usage described herein may be performed using a machine learning system. The machine learning system may include or may be included in a computing device, a server, a cloud computing environment, and/or the like, such as the logging system, the server devices, and/or the centralized log repository, described in more detail elsewhere herein.

As shown by reference number 205, a machine learning model may be trained using a set of observations. The set of observations may be obtained from historical data, such as log data gathered during one or more processes described herein. In some implementations, the machine learning system may receive the set of observations (e.g., as input) from the logging system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the logging system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of application log data, a second feature of user ticket data, a third feature of server log data, and so on. As shown, for a first observation, the first feature may have a value of application data, the second feature may have a value of service not functioning, the third feature may have a value of server data, and so on. These features and feature values are provided as examples, and may differ in other examples. For example, the feature set may include one or more of the following features: a time associated with the observation, a user associated with the observation, a device associated with the observation, a location associated with the observation (e.g., a location of a device associated with the observation, a location of a user associated with the observation, and/or the like), and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is alert, which has a value of service failure for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of error message, a second feature of service lag, a third feature of server load data, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of server is overloaded for the target variable of alert for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to bring an additional server device online, a recommendation to increase a computing resource (e.g., a processor resource, a memory resource, a communication resource, and/or the like) of the server device, a recommendation to send a robot or a service technician to address an issue with the server device, and/or the like. The first automated action may include, for example, automatically implementing an additional server device, automatically performing a load-balancing function, automatically allocating an additional computing resource to the server device, automatically dispatching a robot or a service technician to address an issue with the server device, and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a service failure cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a device failure cluster), then the machine learning system may provide a second (e.g., different) recommendation (e.g., a recommendation to utilize a backup device, a recommendation to repair the device, and/or the like) and/or may perform or cause performance of a second (e.g., different) automated action, such as automatically performing a process to utilize a backup device.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify patterns in the event data, generate actionable alerts, generate a correlation matrix, predict events, classify event data, and/or generate recommendations. The machine learning system enables recognition and/or identification of tens, hundreds, thousands, or millions of features and/or feature values for tens, hundreds, thousands, or millions of observations, thereby increasing accuracy and consistency and reducing delay associated with identify patterns in the event data, generate actionable alerts, generate a correlation matrix, predict events, classify event data, and/or generate recommendations relative to requiring computing resources to be allocated for tens, hundreds, or thousands of operators to manually identify patterns in the event data, generate actionable alerts, generate a correlation matrix, predict events, classify event data, and/or generate recommendations using the features or feature values.

As indicated above, FIG. 2 is provided as an example. Other examples may differ from what is described in connection with FIG. 2.

Figure 3:
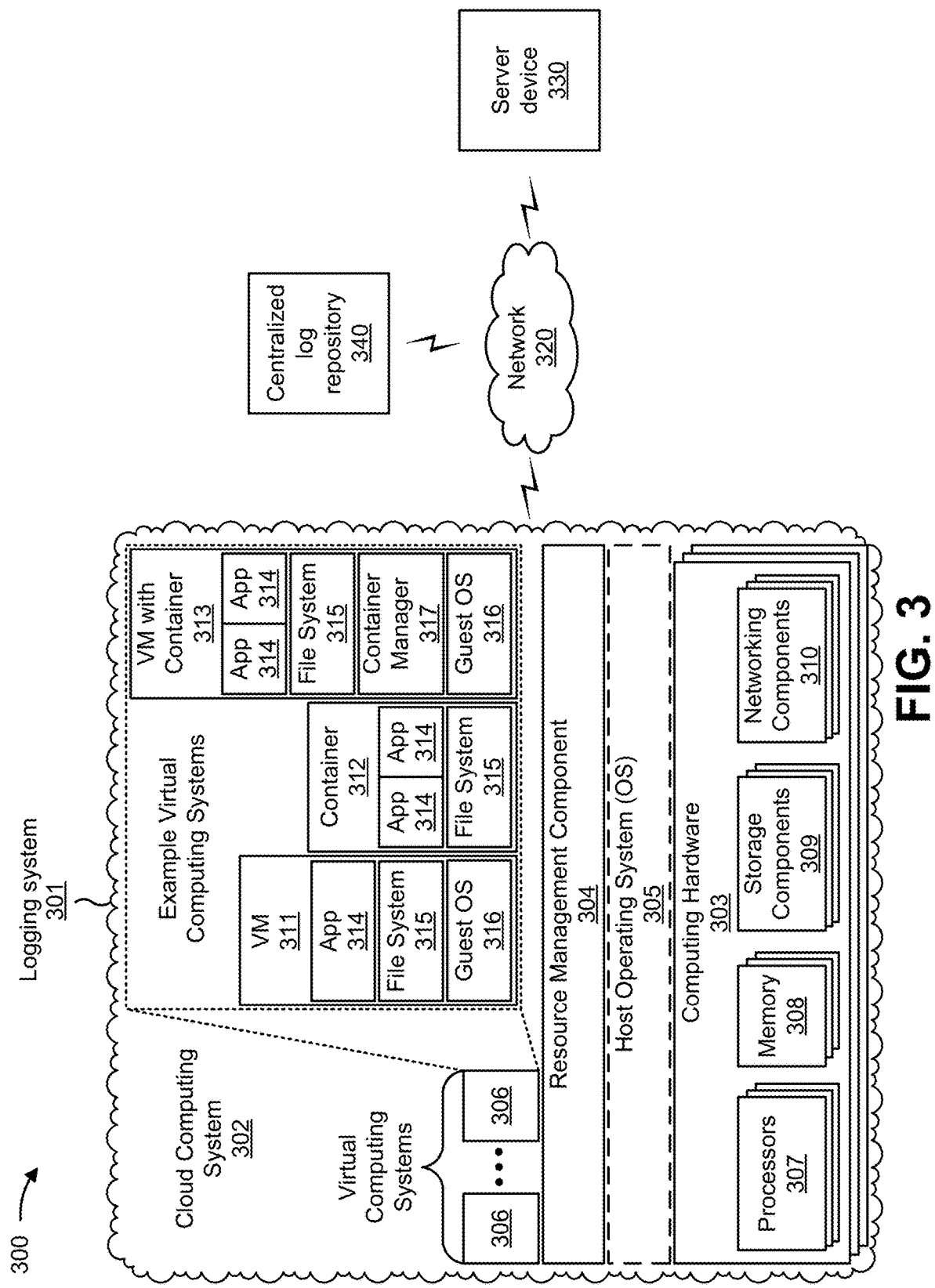
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a logging system 301, which may include one or more elements of and/or may execute within a cloud computing system 302. The cloud computing system 302 may include one or more elements 303-313, as described in more detail below. As further shown in FIG. 3, environment 300 may include a network 320, a server device 330, and/or a centralized log repository 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the logging system 301 may include one or more elements 303-313 of the cloud computing system 302, may execute within the cloud computing system 302, and/or may be hosted within the cloud computing system 302, in some implementations, the logging system 301 may not be cloud-based (e.g., may be implemented outside of a cloud computing system) or may be partially cloud-based. For example, the logging system 301 may include one or more devices that are not part of the cloud computing system 302, such as device 400 of FIG. 4, which may include a standalone server or another type of computing device. The logging system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Server device 330 includes one or more devices capable of receiving, generating, storing, processing, providing, and/or routing information associated with analyzing log data to predict events and generate alerts or recommendations, as described elsewhere herein. Server device 330 may include a communication device and/or a computing device. For example, server device 330 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 330 may communicate with one or more other devices of environment 300, as described elsewhere herein.

Centralized log repository 340 includes one or more devices capable of receiving, generating, storing, processing, and/or providing information associated with analyzing log data to predict events and generate alerts or recommendations, as described elsewhere herein. Centralized log repository 340 may include a communication device and/or a computing device. For example, centralized log repository 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. Centralized log repository 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
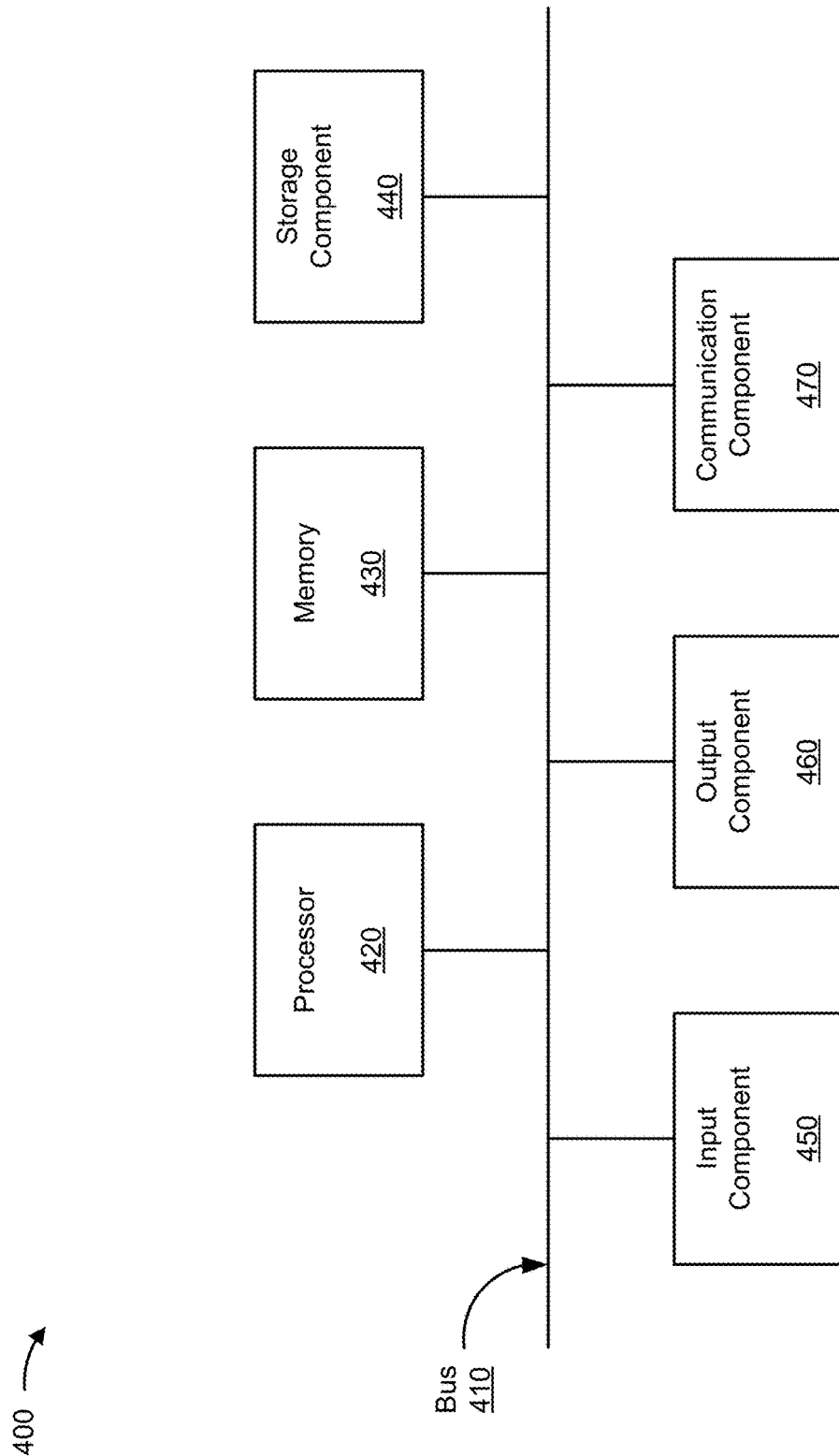
FIG. 4 is a diagram of example components of one or more devices of FIG. 3.

FIG. 4 is a diagram of example components of a device 400, which may correspond to the logging system 301, the server device 330, and/or the centralized log repository 340. In some implementations, the logging system 301, the server device 330, and/or the centralized log repository 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 associated with utilizing machine learning models with a centralized repository of log data to predict events and generate alerts and recommendations. In some implementations, one or more process blocks of FIG. 5 may be performed by a device (e.g., logging system 301). In some implementations, one or more process blocks of FIG. 5 may be performed by another device or a group of devices separate from or including the device, such as a server device (e.g., server device 330), a centralized log repository (e.g., centralized log repository 340), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include receiving log data from application logs associated with applications, service logs associated with services, and server logs associated with server devices (block 510). For example, the device may receive log data from application logs associated with applications, service logs associated with services, and server logs associated with server devices, as described above. The log data may include data identifying one or more of: authentication, authorization, and access data associated with the applications, the services, and the server devices, threats associated with the applications, the services, and the server devices, changes associated with the applications, the services, and the server devices, resource usage associated with the applications, the services, and the server devices, or availability data associated with the applications, the services, and the server devices.

As further shown in FIG. 5, process 500 may include storing the log data in a centralized log repository (block 520). For example, the device may store the log data in a centralized log repository, as described above.

As further shown in FIG. 5, process 500 may include performing natural language processing on the log data, stored in the centralized log repository, to convert the log data into event data identifying events associated with (block 530). For example, the device may perform natural language processing on the log data, stored in the centralized log repository, to convert the log data into event data identifying events associated with, as described above. The event data may include data identifying one or more of: a debug event associated with debugging one of the applications, the services, or the server devices, a warning event associated with one of the applications, the services, or the server devices, a critical event associated with one of the applications, the services, or the server devices, an information event associated with one of the applications, the services, or the server devices, or an error event associated with one of the applications, the services, or the server devices.

As further shown in FIG. 5, process 500 may include processing the event data, with one or more first machine learning models, to identify patterns in the event data and to generate an alert based on the patterns (block 540). For example, the device may process the event data, with one or more first machine learning models, to identify patterns in the event data and to generate an alert based on the patterns, as described above. The one or more first machine learning models may include one or more of: a support vector machine model, a random forest model, a Monte Carlo tree search model, or a temporal difference learning model.

In some implementations, processing the event data, with the one or more first machine learning models, to identify the patterns in the event data and to generate the alert based on the patterns may comprise identifying application behavior patterns based on the event data; identifying historical critical issue data from user ticket data of the event data; classifying the event data based on the application behavior patterns and the history critical issue data, and generate the alert for a critical event identified based on classifying the event data.

As further shown in FIG. 5, process 500 may include processing the event data, with one or more second machine learning models, to generate a correlation matrix for the event data and to predict an event based on the correlation matrix (block 550). For example, the device may process the event data, with one or more second machine learning models, to generate a correlation matrix for the event data and to predict an event based on the correlation matrix, as described above. The one or more second machine learning models include one or more of: a support vector machine model, a random forest model, an auto regressive integrated moving average (ARIMA) model, a seasonal ARIMA model, or a vector autoregressive moving average with exogenous regressors model. The correlation matrix may identify relationships between the log data from the application logs, the log data from the service logs, and the log data from the server logs.

In some implementations, processing the event data, with the one or more second machine learning models, to generate the correlation matrix and to predict the event may comprise separating critical events from the event data; inserting impact data in the event data without the critical events; identifying correlations and seasonal variations in the event data and the impact data; generating the correlation matrix based on the correlations and the seasonal variations in the event data and the impact data; and predicting the event based on the correlation matrix.

As further shown in FIG. 5, process 500 may include processing the event data, with one or more third machine learning models, to classify the event data based on the categories and to generate a recommendation based on classifying the event data (block 560). For example, the device may process the event data, with one or more third machine learning models, to classify the event data based on the categories and to generate a recommendation based on classifying the event data, as described above. The one or more third machine learning models include one or more of: a support vector machine model, a random forest model, a Monte Carlo tree search model, a temporal difference learning model, or a dynamic sentence generation model.

In some implementations, processing the event data, with the one or more third machine learning models, to classify the event data based on the categories and to generate the recommendation comprises classifying the event data into the categories; identifying, based on classifying the event data into the categories, correlations between application response times and hardware metrics of the server devices; and generating the recommendation based on the correlations between the application response times and the hardware metrics of the server devices.

As further shown in FIG. 5, process 500 may include performing one or more actions based on one or more of the alert, the event, or the recommendation (block 570). For example, the device may perform one or more actions based on one or more of the alert, the event, or the recommendation, as described above.

In some implementations, performing the one or more actions comprises one or more of: providing data identifying the one or more of the alert, the event, or the recommendation for display; causing an application to be reprogrammed based on the one or more of the alert, the event, or the recommendation; causing one of the server devices to restart based on the one or more of the alert, the event, or the recommendation; or causing a new server device to be implemented based on the one or more of the alert, the event, or the recommendation.

Alternatively, and/or additionally, performing the one or more actions comprises one or more of: causing a robot to be dispatched to service one of the server devices based on the one or more of the alert, the event, or the recommendation; causing a technician to be dispatched to service one of the server devices based on the one or more of the alert, the event, or the recommendation; or retraining one or more of the one or more first machine learning models, the one or more second machine learning models, or the one or more third machine learning models based on the one or more of the alert, the event, or the recommendation. In some implementations, the one or more actions include generating a user interface that includes a dashboard displaying the event data, the alert, the event, and the recommendation; and providing the user interface for display.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, log data from application logs associated with applications, service logs associated with services, and server logs associated with server devices;
   storing, by the device, the log data in a centralized log repository;
   performing, by the device, natural language processing on the log data, stored in the centralized log repository, to convert the log data into event data identifying events associated with categories;
   processing, by the device, the event data, with one or more machine learning models, to generate a correlation matrix for the event data and to predict an event based on the correlation matrix; and
   performing, by the device, one or more actions based on one or more of an alert, the event, or a recommendation,
      wherein processing the log data, with the one or more machine learning models, to generate the correlation matrix for the log data and to predict the event based on the correlation matrix comprises:
         separating critical events from the log data;
         inserting impact data in the log data without the critical events;
         identifying correlations and seasonal variations in the log data and the impact data;
         generating the correlation matrix based on the correlations and the seasonal variations in the log data and the impact data; and
         predicting the event based on the correlation matrix.

2. The method of claim 1, wherein performing the one or more actions comprises one or more of:
   providing data identifying the one or more of the alert, the event, or the recommendation for display;
   causing an application to be reprogrammed based on the one or more of the alert, the event, or the recommendation;
   causing one of the server devices to restart based on the one or more of the alert, the event, or the recommendation; or
   causing a new server device to be implemented based on the one or more of the alert, the event, or the recommendation.

3. The method of claim 1, wherein performing the one or more actions comprises one or more of:
   causing a robot to be dispatched to service one of the server devices based on the one or more of the alert, the event, or the recommendation;
   causing a technician to be dispatched to service one of the server devices based on the one or more of the alert, the event, or the recommendation; or
   retraining one or more of the one or more machine learning models based on the one or more of the alert, the event, or the recommendation.

4. The method of claim 1, further comprising:
   processing the event data, with one or more first machine learning models, to identify patterns in the event data and to generate the alert based on the patterns,
      wherein the one or more first machine learning models include one or more of:
         a support vector machine model,
         a random forest model,
         a Monte Carlo tree search model, or
         a temporal difference learning model, and
      wherein the one or more machine learning models are one or more second machine learning models.

5. The method of claim 1, wherein the one or more machine learning models include one or more of:
   a support vector machine model,
   a random forest model,
   an auto regressive integrated moving average (ARIMA) model,
   a seasonal ARIMA model, or
   a vector autoregressive moving average with exogenous regressors model.

6. The method of claim 1, further comprising:
   processing the event data, with one or more different machine learning models, to classify the event data based on the categories and to generate the recommendation based on classifying the event data,
      wherein the one or more different machine learning models include one or more of:
         a support vector machine model,
         a random forest model,
         a Monte Carlo tree search model,
         a temporal difference learning model, or
         a dynamic sentence generation model.

7. The method of claim 1, further comprising:
identifying application behavior patterns based on the event data;
identifying historical critical issue data from user ticket data of the event data;
classifying the event data based on the application behavior patterns and the history critical issue data; and
generating the alert for a critical event identified based on classifying the event data.

8. A device, comprising:
one or more memories; and
one or more processors, communicatively coupled to the one or more memories, configured to:
receive log data from application logs associated with applications, service logs associated with services, and server logs associated with server devices;
store the log data in a centralized log repository for a predetermined retention time period;
perform natural language processing on the log data, stored in the centralized log repository, to convert the log data into event data identifying events associated with categories;
selectively:
process the event data, with one or more first machine learning models, to identify patterns in the event data and to generate an alert based on the patterns;
process the event data, with one or more second machine learning models, to generate a correlation matrix for the event data and to predict an event based on the correlation matrix; or
process the event data, with one or more third machine learning models, to classify the event data based on the categories and to generate a recommendation based on classifying the event data; and
perform one or more actions based on one or more of the alert, the event, or the recommendation,
wherein the one or more processors, when processing the event data, with the one or more machine second learning models, to generate the correlation matrix for the event data and to predict the event based on the correlation matrix, are configured to:
separate critical events from the event data,
insert impact data in the event data without the critical events,
identify correlations and seasonal variations in the event data and the impact data,
generate the correlation matrix based on the correlations and the seasonal variations in the event data and the impact data, and
predict the event based on the correlation matrix.

9. The device of claim 8, wherein the one or more processors, when processing the event data, with the one or more third machine learning models, to classify the event data based on the categories and to generate the recommendation based on classifying the event data, are configured to:
classify the event data into the categories;
identify, based on classifying the event data into the categories, correlations between application response times and hardware metrics of the server devices; and
generate the recommendation based on the correlations between the application response times and the hardware metrics of the server devices.

10. The device of claim 8, wherein the log data includes data identifying one or more of:
authentication, authorization, and access data associated with the applications, the services, and the server devices,
threats associated with the applications, the services, and the server devices,
changes associated with the applications, the services, and the server devices,
resource usage associated with the applications, the services, and the server devices, or
availability data associated with the applications, the services, and the server devices.

11. The device of claim 8, wherein the event data includes data identifying one or more of:
a debug event associated with debugging one of the applications, the services, or the server devices,
a warning event associated with one of the applications, the services, or the server devices,
a critical event associated with one of the applications, the services, or the server devices,
an information event associated with one of the applications, the services, or the server devices, or
an error event associated with one of the applications, the services, or the server devices.

12. The device of claim 8, wherein the one or more processors, when performing the one or more actions, are configured to:
generate a user interface that includes a dashboard displaying the event data, the alert, the event, and the recommendation; and
provide the user interface for display.

13. The device of claim 8, wherein the correlation matrix identifies relationships between the log data from the application logs, the log data from the service logs, and the log data from the server logs.

14. The device of claim 8, wherein the one or more processors are configured to:
process the event data, with the one or more first machine learning models, to identify the patterns in the event data and to generate the alert based on the patterns; and
process the event data, with the one or more second machine learning models, to generate the correlation matrix for the event data and to predict the event based on the correlation matrix.

15. The device of claim 8, wherein the one or more processors are configured to:
process the event data, with the one or more second machine learning models, to generate the correlation matrix for the event data and to predict the event based on the correlation matrix; and
process the event data, with the one or more third machine learning models, to classify the event data based on the categories and to generate the recommendation based on classifying the event data.

16. A non-transitory computer-readable medium storing instructions, the instructions comprising:
one or more instructions that, when executed by one or more processors, cause the one or more processors to:
receive log data from application logs associated with applications, service logs associated with services, and server logs associated with server devices;
store the log data in a centralized log repository;
process the log data, with one or more machine learning models, to generate a correlation matrix for the log data and to predict an event based on the correlation matrix;

and
perform one or more actions based on one or more of an alert, the event, or a recommendation,
wherein the one or more instructions, that cause the one or more processors to process the log data, with the one or more machine learning models, to generate the correlation matrix for the log data and to predict the event based on the correlation matrix, cause the one or more processors to:
separate critical events from the log data;
insert impact data in the log data without the critical events;
identify correlations and seasonal variations in the log data and the impact data;
generate the correlation matrix based on the correlations and the seasonal variations in the log data and the impact data; and
predict the event based on the correlation matrix.

17. The non-transitory computer-readable medium of claim 16, wherein the one or more instructions, that cause the one or more processors to perform the one or more actions, cause the one or more processors to one or more of:
provide data identifying the one or more of the alert, the event, or the recommendation for display;
cause an application to be reprogrammed based on the one or more of the alert, the event, or the recommendation;
cause one of the server devices to restart based on the one or more of the alert, the event, or the recommendation; or
cause a new server device to be implemented based on the one or more of the alert, the event, or the recommendation;
cause a robot to be dispatched to service one of the server devices based on the one or more of the alert, the event, or the recommendation;
cause a technician to be dispatched to service one of the server devices based on the one or more of the alert, the event, or the recommendation; or
retrain the one or more machine learning models based on the one or more of the alert, the event, or the recommendation.

18. The non-transitory computer-readable medium of claim 16, wherein the one or more instructions further cause the one or more processors to:
identify application behavior patterns based on the log data;
identify historical critical issue data from user ticket data of the log data;
classify the log data based on the application behavior patterns and the history critical issue data; and
generate the alert for a critical event identified based on classifying the log data.

19. The non-transitory computer-readable medium of claim 16, wherein the one or more instructions further cause the one or more processors to:
classify the log data into categories;
identify, based on classifying the log data into the categories, correlations between application response times and hardware metrics of the server devices; and
generate the recommendation based on the correlations between the application response times and the hardware metrics of the server devices.

20. The non-transitory computer-readable medium of claim 16, wherein the log data includes data identifying one or more of:
authentication, authorization, and access data associated with the applications, the services, and the server devices,
threats associated with the applications, the services, and the server devices,
changes associated with the applications, the services, and the server devices,
resource usage associated with the applications, the services, and the server devices, or
availability data associated with the applications, the services, and the server devices.

* * * * *